July 24, 1923.

W. R. STUCK

FLOWER HOLDER

Filed Jan. 21, 1922

1,462,947

Inventor:
W. R. Stuck.
by Hazard & Miller
Attys.

Patented July 24, 1923.

1,462,947

UNITED STATES PATENT OFFICE.

WILLIAM R. STUCK, OF LOS ANGELES, CALIFORNIA, ASSIGNOR, BY MESNE ASSIGNMENTS, TO THE DAZEY MANUFACTURING COMPANY, OF LOS ANGELES, CALIFORNIA, A CORPORATION OF CALIFORNIA.

FLOWER HOLDER.

Application filed January 21, 1922. Serial No. 530,804.

*To all whom it may concern:*

Be it known that I, WILLIAM R. STUCK, a citizen of the United States, residing at Los Angeles, in the county of Los Angeles and State of California, have invented new and useful Improvements in Flower Holders, of which the following is a specification.

My invention relates to flower holders of the general type disclosed in U. S. Letters Patent No. 1,196,312, issued to me August 29, 1916, the principal objects of my invention being to generally improve upon and simplify the construction of the holder disclosed in my aforesaid patent, as well as other existing forms of flower holders; to provide a relatively simple and practical form of flower holder that may be easily and cheaply produced and by means of which the stems of flowers may be firmly supported, consequently displaying the blossoms and the foliage of the flowers to the best advantage.

A further object of my invention is to provide a flower holder that combines a container in the nature of a bowl or shallow vase and a pair of reticulated or foraminous members that are arranged within the container and which serve to firmly support the stems of the flowers that are arranged in the container.

With the foregoing and other objects in view, my invention consists in the features of construction and combination and arrangement of parts hereinafter more fully described and claimed, reference being had to the accompanying drawings, in which—

Figure 1:
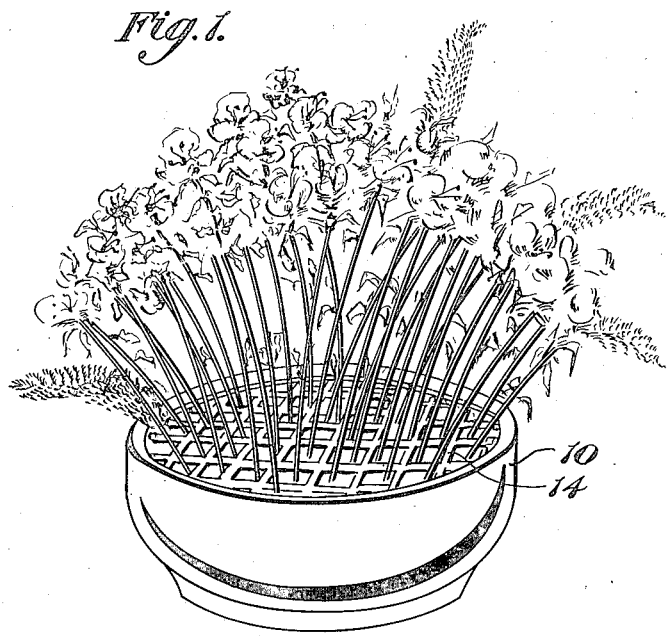
Figure 1 is a perspective view of a flower holder of my improved construction, showing a bouquet arranged therein.
Figure 2:
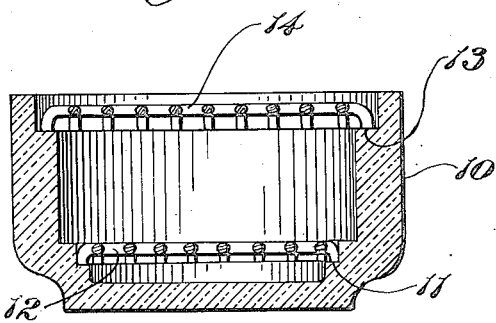
Figure 2 is a vertical section taken through the center of a flower holder of my improved construction.

Referring by numerals to the accompanying drawings, and particularly to the form of device illustrated in Figures 1 and 2, 10 designates a bowl or shallow vase that is preferably formed of glass or earthen material, and formed within said container adjacent to the bottom thereof is a horizontally disposed ledge or shoulder 11 upon which is adapted to rest the marginal portion of the lower reticulated or foraminous member 12 of the holder. This member may consist of a plate or sheet of metal or like material in which is formed a series of openings or it may be cast in the form of a grid, its shape and size being such that its marginal portion may rest directly upon the ledge or shoulder 11.

Formed upon the upper portion of the annular wall of the bowl or container 10 is a horizontally disposed ledge or shoulder 13, and resting thereupon is the marginal portion of the upper foraminous or reticulated member 14, which latter may be of grid construction or a plate in which is formed a series of apertures.

Figure 3:
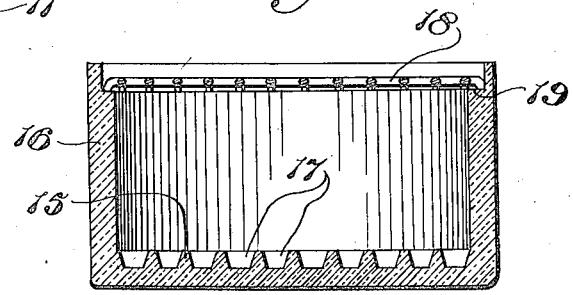
Figure 3 is a vertical construction taken through the center of a modified form of the holder.

In the modified form of holder illustrated in Figure 3 a series of intersecting ribs 15 are formed on the upper surface of the bottom of the bowl or container 16, which construction provides a series of pockets or depressions 17 that are adapted to receive the lower ends of the stems of the flowers that are placed in the bowl or container. In this form of device a reticulated or foraminous member 18 is removably positioned in the upper portion of the bowl or container with its marginal portion resting upon a ledge or shoulder 19 that is formed on the inner face of the wall of the container adjacent to its upper edge.

In the use of my improved holder, the bowl or container is partially filled with water and the stems of the flowers are inserted through the openings in the reticulated or foraminous members 12 and 13, which latter provide firm and substantial bearings for the stems at separated points and with the lower member 12 engaging the stems of the flowers at points above their lower ends. Such construction provides a firm and substantial support for the stems of the flowers and enables the same to be artistically arranged.

A flower holder of my improved construction is comparatively simple, may be easily and cheaply produced and is very effective in performing its intended functions.

It will be understood that minor changes in the size, form and construction of the various parts of my improved flower holder may be made and substituted for those herein shown and described, without departing from the spirit of my invention, the scope of which is set forth in the appended claims.

I claim:

1. The combination with a container provided with internally arranged ledges, one of which occupies a plane a short distance above the bottom of the container, of reticulated members positiond upon said ledges.

2. The combination with a container provided with internally arranged ledges, one of which occupies a plane a short distance above the bottom of the container, of flower supporting members positioned upon said ledges.

3. The combination with a container, of means formed in the lower portion thereof and adapted to receive the lower ends of flower stems, and a stem supporting member removably arranged in the upper portion of said container.

4. A flower container having spaced ledges formed interiorly thereof, and flower supporting members positioned upon said ledges.

In testimony whereof I have signed my name to this specification.

WILLIAM R. STUCK.